No. 714,726. Patented Dec. 2, 1902.
H. E. MARSH.
PIPE UNION.
(Application filed Feb. 13, 1902.)
(No Model.)

Henry E. Marsh, Inventor

Witnesses
Jas. K. McCathran
B. G. Foster

By
E. G. Siggers
Attorney

UNITED STATES PATENT OFFICE.

HENRY E. MARSH, OF NEW HAVEN, CONNECTICUT.

PIPE-UNION.

SPECIFICATION forming part of Letters Patent No. 714,726, dated December 2, 1902.

Application filed February 13, 1902. Serial No. 93,900. (No model.)

*To all whom it may concern:*

Be it known that I, HENRY E. MARSH, a citizen of the United States, residing at New Haven, in the county of New Haven and State of Connecticut, have invented a new and useful Pipe-Union, of which the following is a specification.

The present invention relates to pipe-unions; and the object thereof is to improve the same in certain structural details to provide a joint that is not only liquid-tight, but is not liable to become irrevocably fixed against dismemberment.

The feature of the invention resides in the specific construction of the adjacent ends of the pipe members and the specific construction of the washers placed between the two, whereby a secure joint is formed and said washers are supported and clamped by the pipe members.

The construction preferably employed is fully illustrated in the accompanying drawings, wherein—

Figure 1:
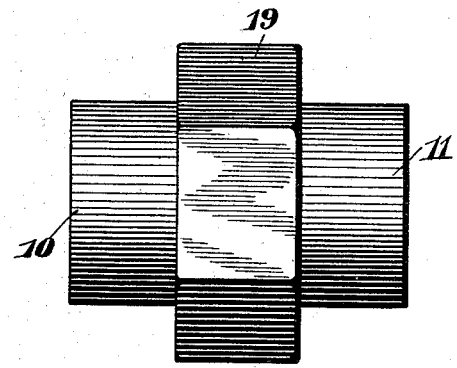
Figure 2:
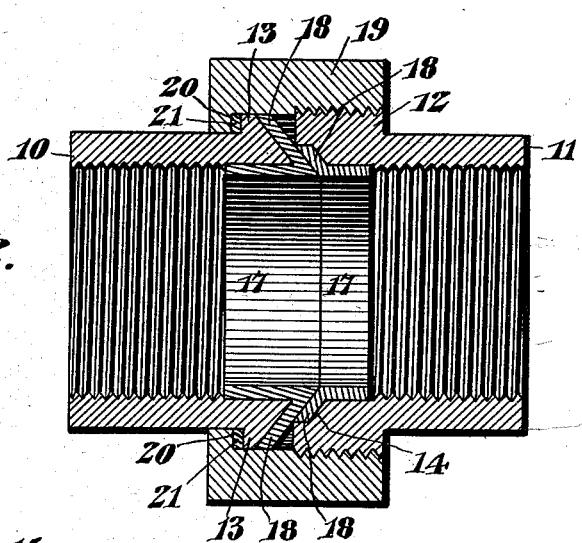
Figure 3:
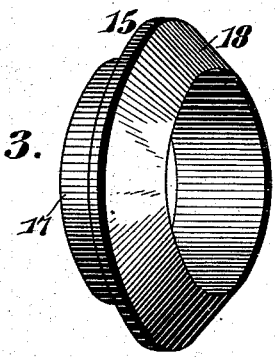
Figure 4:
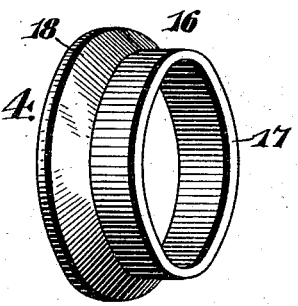

Figure 1 is a side elevation of a pipe-union. Fig. 2 is a sectional view through the same, and Figs. 3 and 4 are perspective views of the two washers employed.

Similar numerals of reference designate corresponding parts in all the figures of the drawings.

The two pipe members (designated, respectively, 10 and 11) are in the form of internally-threaded sleeves, one of said pipe members having an enlarged end 12, provided with screw-threads, the adjacent end of the other member having an annular exterior flange 13. The adjacent ends of the pipe members are correspondingly beveled, one being preferably provided with a depressed seat, as 14.

The washers 15 and 16 are each made of sheet metal and comprise collars 17, that are fitted within the adjacent ends of the pipe members, said collars being provided with outstanding bearing-flanges 18, that are inclined to correspond to the bevel of the faces of the respective pipe members. As a result the flange of one of said washers will be located at an acute angle to the collar, while the other will be disposed at an obtuse angle, and said flanges, furthermore, bear against the beveled faces of the members. The washers are preferably constructed of sheet metal, so that they may be stamped to proper form, and are of some non-corrodible material, such as zinc, copper, brass, or the like. The outstanding flanges will of course be correspondingly beveled, and their adjacent faces will fit snugly together, being clamped securely between the ends of the pipe members.

The two members are secured together by a coupling-nut 19, threaded upon the enlarged portion 12 of one member and having an inner annular shoulder 20, that coacts with the outstanding flange 13 of the other member. Between said flange and shoulder is interposed the washer 21, which is also made of some non-corrodible material that holds the adjacent faces of the nut and member 10 apart and prevents their union by corrosion. By this construction the coacting washers may be made from sheet metal, and as the joint is made between their outstanding flanges said flanges being backed up by the pipe members are securely held in coacting relation and cannot readily become displaced when the coupling is made.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a pipe-coupling, the combination with pipe members having their adjacent end faces correspondingly beveled, of metallic washers having collars fitted within the adjacent ends of the pipe members and provided with outstanding bearing-flanges that are inclined to correspond with the bevel of the end faces of said pipe members and rest against said faces, the coacting faces of the flanges being also beveled, said coacting faces being located between the ends of the pipe members and bearing against each other, and a coupling-nut connecting the two pipe members.

2. In a pipe-union, the combination with pipe members having their adjacent end faces correspondingly beveled, of sheet-metal washers having collars fitted within the adjacent ends of the pipe members and provided with outstanding bearing-flanges that are inclined to correspond with the bevel of the faces of said pipe members and rest against the same to present correspondingly-beveled faces which bear against each other, an annular flange projecting from one of the pipe members, screw-threads located upon the other member, a coupling-nut threaded upon said member and having an annular shoulder that coacts with the flange of the first-mentioned member, and a non-corrodible metallic washer interposed between said flange and shoulder.

3. In a pipe-union, the combination with pipe members arranged end to end, of sheet-metal washers having collars provided with outer smooth faces, slipped into the adjacent ends of the pipe members, and outstanding flanges fitted between the ends of the pipe members and bearing against each other, the ends of the pipe members clamping the flanges together to prevent the movement of the washers in either direction with relation to the pipe members.

4. In a pipe-union, the combination with pipe members arranged end to end and having beveled inner ends, of sheet-metal unthreaded washers arranged within the pipe members, each washer having a flange at one end, the flange of one washer being arranged at an acute angle and the flange of the other washer being disposed at an obtuse angle, the said flanges fitting the corresponding beveled ends of the pipe members, the two flanges meeting and fitting flat against each other between the ends of the pipe members.

In testimony that I claim the foregoing as my own I have hereto affixed my signature in the presence of two witnesses.

HENRY E. MARSH.

Witnesses:
BENJAMIN FIERSTEIN,
B. BRIMBERG.